Patented Feb. 23, 1926.

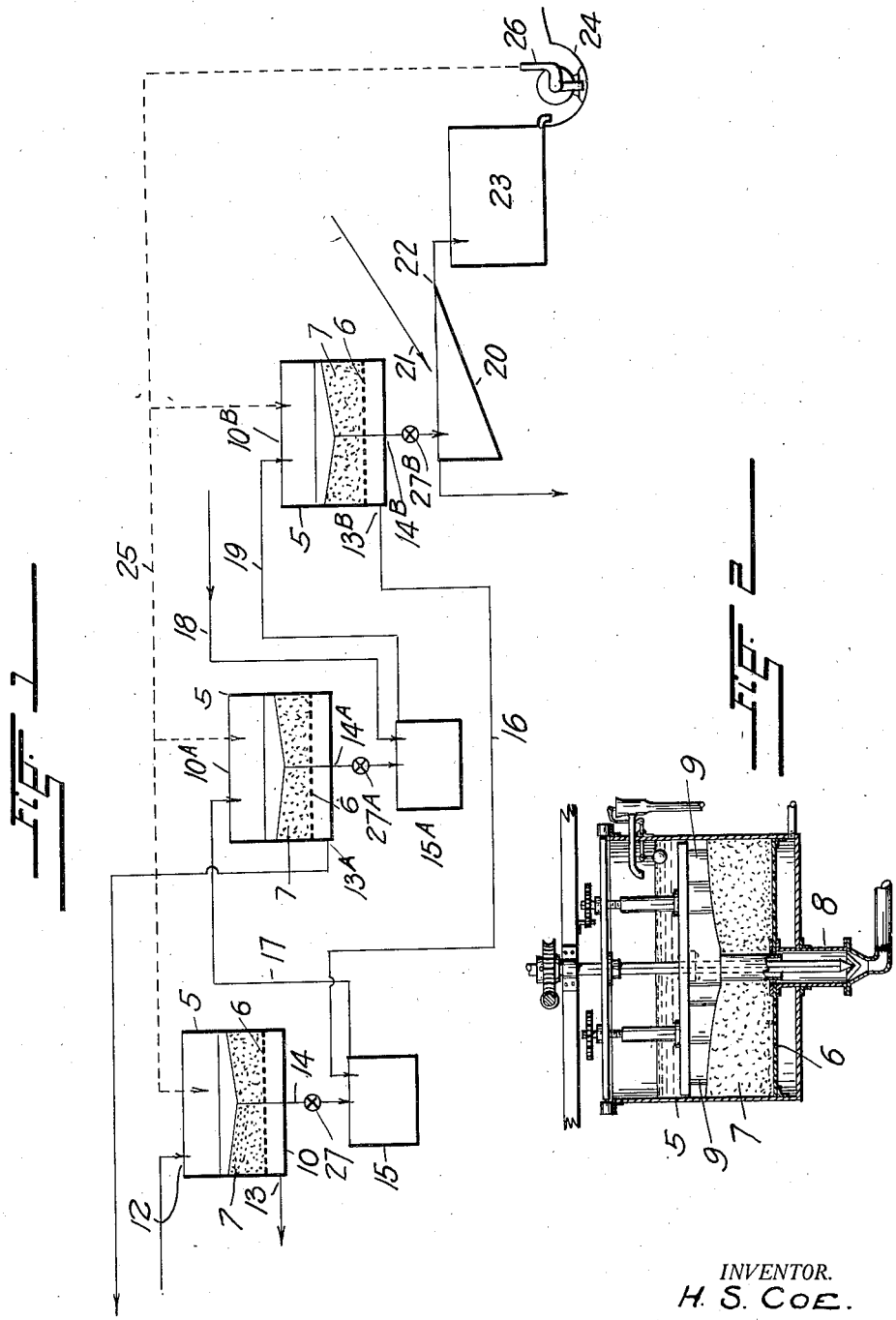

1,574,558

UNITED STATES PATENT OFFICE.

HARRISON S. COE, OF MOUND CITY, KANSAS, ASSIGNOR, BY MESNE ASSIGNMENTS, TO THE CYCLE COMPANY, OF COLORADO SPRINGS, COLORADO, A CORPORATION OF COLORADO.

FILTERING PROCESS.

Application filed January 26, 1920, Serial No. 354,178. Renewed October 29, 1925.

*To all whom it may concern:*

Be it known that I, HARRISON S. COE, a citizen of the United States, residing at Mound City, in the county of Linn and State of Kansas, have invented certain new and useful Improvements in Filtering Processes, of which the following is a specification.

This invention relates to a filtering process and its primary object is to eliminate in a process of filtration used in the production of sugar, phosphoric acid and other substances, the detrimental effects of influences which in processes at present in use retard the complete separation of the liquid from the solids in material under treatment and increase the cost of operation.

Principal among these influences are—

1st.—A slow settling movement of the solids in the liquid of the mixture to be separated;

2nd.—A chemical action of the liquid on the filtering medium, impairing the efficiency thereof, and 3rd.—Clogging of the filtering medium by parts of the material under treatment, which reduces its filtering capacity.

With the above object in view, I employ in a filtering process, a preferably chemically inert granular filtering medium such as sand, charcoal or other suitable material the fouled portions of which are automatically removed with the residue of the filtering action and are subsequently recovered therefrom to be again used for the same purpose.

My improved process is more particularly adapted for use in the separation of the liquids from solids in mixtures, by what is commonly known as the progressive dilution or counter-current washing method in which the residues of a series of filtering units are washed with a weaker solution of the soluble substances than that from which they were obtained, for the purpose of recovering from the residues the portion of the liquid unavoidably discharged therewith.

I desire it understood, however, that in connection with my improved process for the filtration of materials any other method adapted to effect a substantially complete separation of the liquids from the solids to recover the granular filtering medium from the final product, may be advantageously employed.

In the accompanying drawings—

Figure 1 represents diagrammatically the various steps and the flow of materials in a process of filtration in which liquids are separated from the residues by counter-current washing, and Figure 2, represents a sectional view of one of the filters used in the process.

The apparatus shown in Figure 2 is the subject of a separate application for patent, Serial Number 354,177, filed Jan. 26, 1920, and it is an improved modification of the construction shown and described in my application for patent, Serial Number 317,237, filed August 13, 1919.

The apparatus consists of a preferably cylindrical tank 5 which has a perforated false bottom 6 for the passage of the filtrate percolated through a granular filtering medium 7 placed above the same.

The mixture to be separated is fed into the tank above the filter bed and the fouled upper strata of the latter are together with the solid residue of the material continuously moved into a central discharge conduit 8 passing through the filtering medium, by a series of rotary scrapers 9 while the filtering process is in progress.

In the process hereinafter to be described in detail with reference to the diagrammatic representation, the filtrate obtained from a second stage in a series of filtration stages is employed to dilute the stronger liquid in the residue of a preceding stage and the diluted matter is treated in a stage intermediate of the others.

In Figure 1 of the drawings, the filtering stages in the progressive treatment of the material are accomplished in three filtering units 10, 10$^A$ and 10$^B$ of the type shown in Figure 2 and hereinbefore described.

The fresh material is fed into the first unit of the series as at 12. The filtrate percolated through the granular filtering material is discharged at 13 from the space of the tank below its perforated bottom and the residue of the material remaining upon the surface of the filtering medium is together with the upper strata of the latter and some of the liquid of the feed moved into the central conduit of the filter and discharged at 14 into a mixing chamber 15.

The same action takes place in each of the three filtering units, and the filtrate discharged from the filter 10$^B$ at 13$^B$ is conducted along the line 16 to dilute the stronger solution which was contained in the residue discharged from the filter 10, in the mixing chamber 15. The diluted mixture is discharged from the chamber 15 along the line 17 and fed into the second filter 10$^A$ the filtrate of which is discharged at 13$^A$ and the residue of which is together with a portion of the filtering medium and some of the solution discharged at 14$^A$ into a second mixing chamber 15$^A$.

The residue in the last-mentioned chamber is diluted with barren liquid entering along the line 18 and the diluted mixture is fed into the third filter 10$^B$ along the line 19.

The final residue consisting of a mixture of the solids contained in the original feed, a proportionate amount of the filtering medium discharged from each filtering unit, and barren liquid, is discharged from the last filter of the series into a classifier 20 or other separating device adapted to separate the filtering medium from the other substances contained in the residue by the action of a wash water supplied at 21.

The filtering material discharged from the separator at 22 passes into a storage tank 23 from where it is sluiced to a sump 24 and returned through a pipe-line 25 to the different filters by the action of a pump 26 whenever the filtering mediums in the filters are exhausted.

The steps in the process by which the filtering medium is recovered may be modified and entirely or in part replaced by a separating action of similar character ahead of the first filter of the series, in case the material under treatment contains sufficient sand to replace the discharged filtering medium, it being understood that in such case the sand is separated from the material before it is fed into the filter.

The discharge of the residue and filtering substance from the filters may be expedited, facilitated and controlled by the use of diaphragm pumps 27, 27$^A$ and 27$^B$ or other similar means.

Having thus described my invention what I claim and desire to secure by Letters-Patent is:

1. A process of filtration consisting in causing liquid in a mixture of liquid and solids to percolate through a permeable filtering substance, and removing a portion of said substance with the residue of the mixture settling thereon, in different filtering units, washing the residue of one unit with the filtrate of a second unit, treating the diluted residue in a third unit, washing the residue of the third unit, and conveying it to the second unit, and recovering the filtering material from the residue of the last-mentioned unit.

2. A process of filtration consisting in causing liquid in a mixture of liquid and solids to percolate through a permeable filtering substance, and removing a portion of said substance with the residue of the mixture settling thereon, in different filtering units, washing the residue of one unit with the filtrate of a second unit, treating the diluted residue in a third unit, washing the residue of the third unit and conveying it to the second unit, recovering the filtering material from the residue of the last-mentioned unit, and returning the recovered filtering material for reuse, to the different units.

3. A process of filtration consisting in causing liquid in a mixture of liquid and solids to percolate through a permeable filtering substance, and removing a portion of said substance with the residue of the mixture settling thereon, in different filtering units, washing the residue of one unit with the filtrate of a second unit, treating the diluted residue in a third unit, washing the residue of the third unit and conveying it to the second unit, recovering the filtering material from the residue of the last-mentioned unit, and returning the recovered filtering material for reuse.

4. A process of filtration consisting in causing liquid in a mixture of liquid and solids, to percolate through a permeable filtering substance and removing a portion of said substance with the residue of the mixture, settling thereon, in different filtering units, washing the removed matter of one unit with the filtrate of another unit, and recovering the filtering material from the residue of the last unit.

5. A process of filtration consisting in causing liquid in a mixture of liquid and solids, to percolate through a permeable filtering substance, and removing a portion of said substance with the residue of the mixture, settling thereon, in different filtering units, and washing the removed matter of one unit with the filtrate of another unit.

6. A process of filtration consisting in causing liquid in a mixture of liquid and solids, to percolate through a permeable filtering substance, and automatically removing the residue of the mixture, settling on said substance, in different filtering units, and washing the residue of one unit with the filtrate of another.

7. A process of filtration consisting in causing liquid in a mixture of liquid and solids, to percolate, through a permeable filtering substance and automatically removing the residue of the mixture, settling on said substance, in different filtering units, washing the residue of one unit with the filtrate of a second unit, treating the diluted residue in a third unit and washing the residue of the third unit and conveying it to the second unit.

In testimony whereof I have affixed my signature.

HARRISON S. COE.